W. E. HAMILTON.
MINING APPARATUS.
APPLICATION FILED JULY 1, 1913. RENEWED SEPT. 29, 1917.
Patented May 13, 1919.
11 SHEETS—SHEET 1.
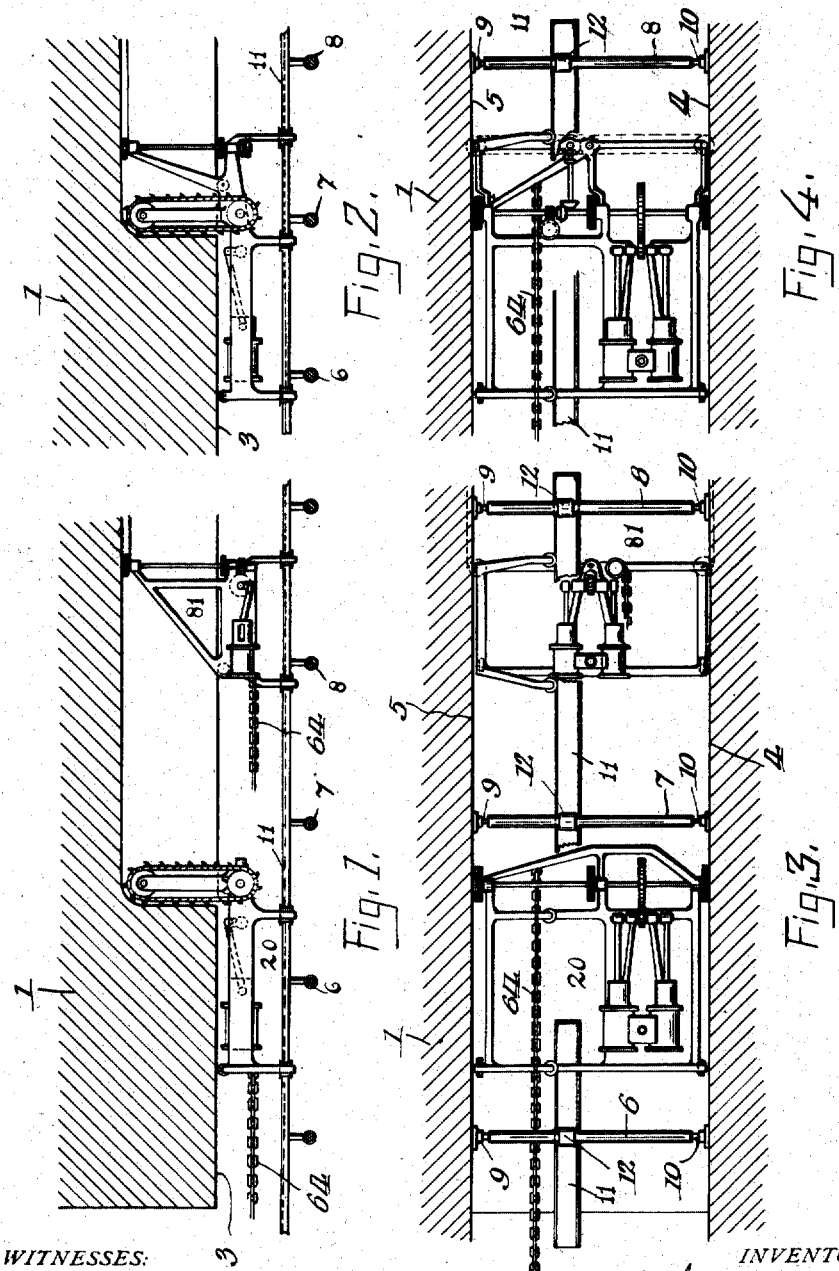

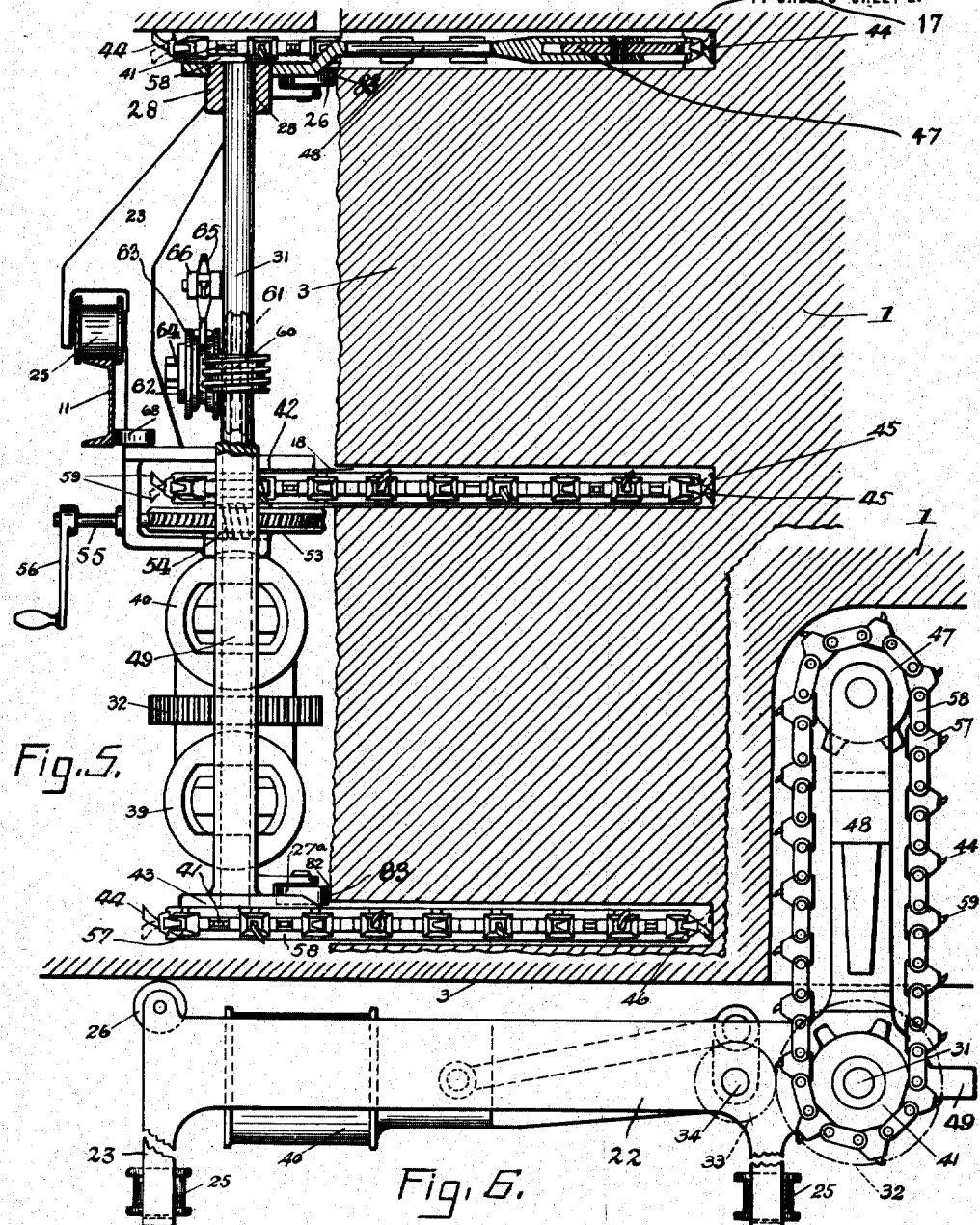

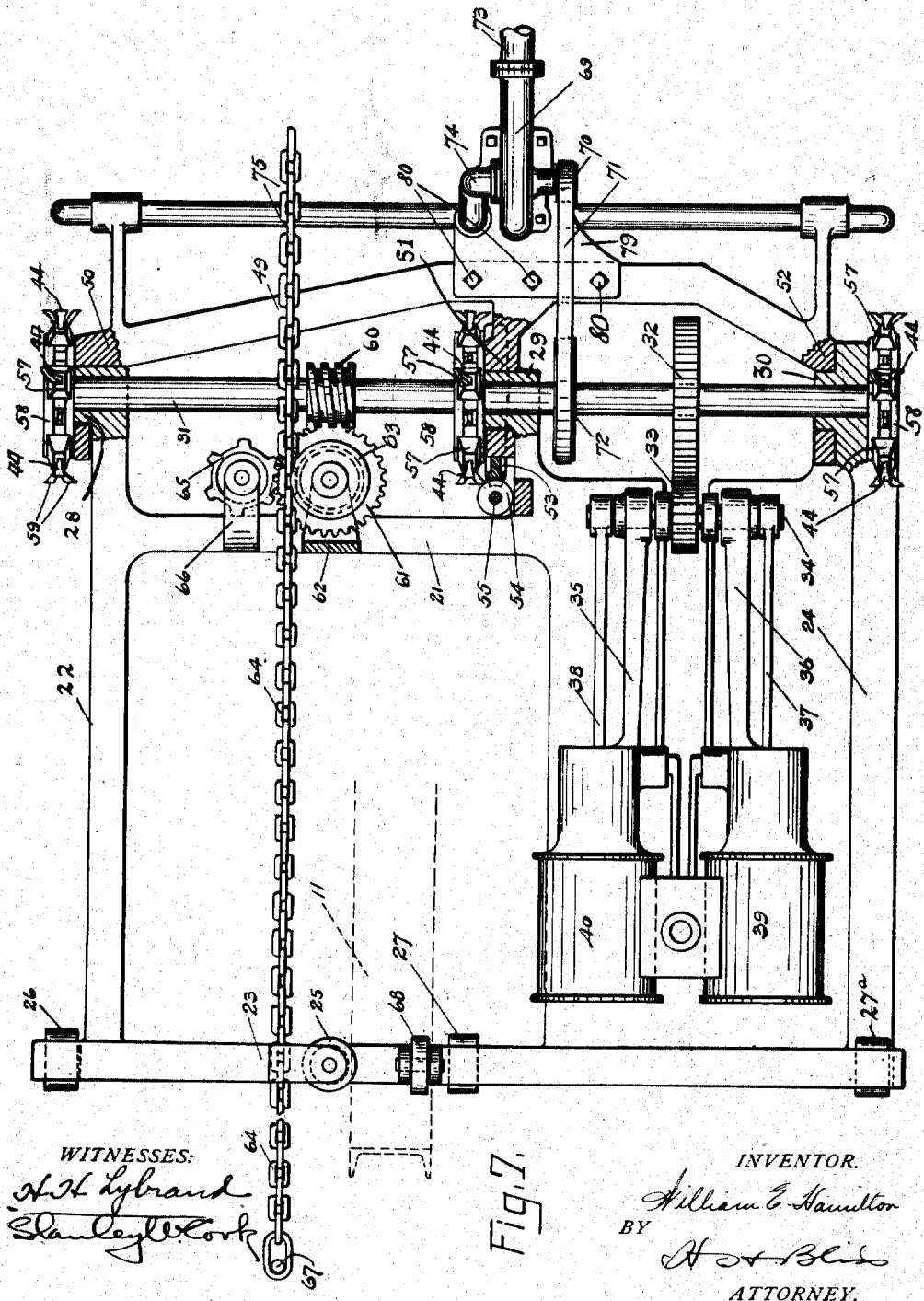

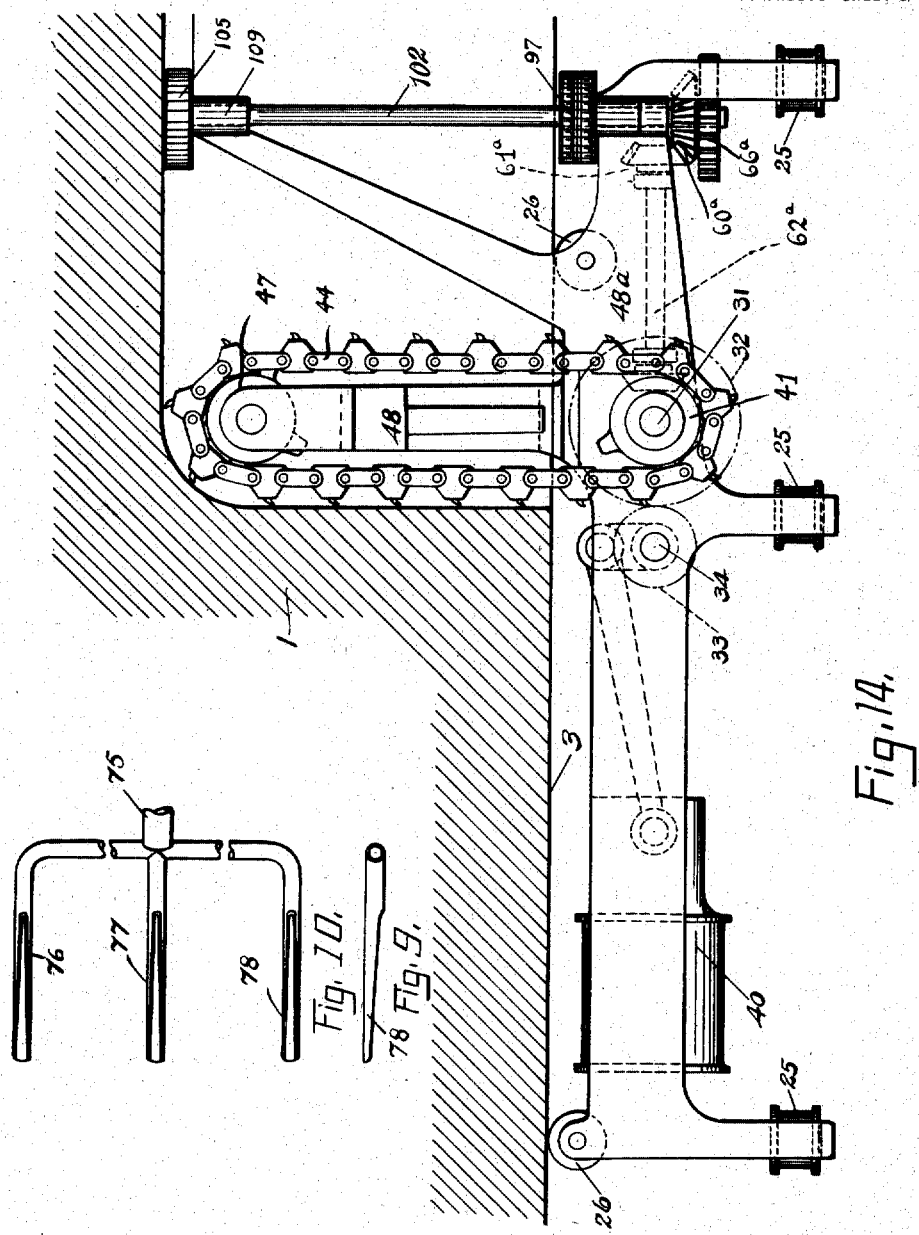

W. E. HAMILTON.
MINING APPARATUS.
APPLICATION FILED JULY 1, 1913. RENEWED SEPT. 29, 1917.

1,303,303.

Patented May 13, 1919.
11 SHEETS—SHEET 2.

WITNESSES:
H. H. Lybrand
Stanley B. Cook

INVENTOR
William E. Hamilton
BY
H. H. Bl——
ATTORNEY.

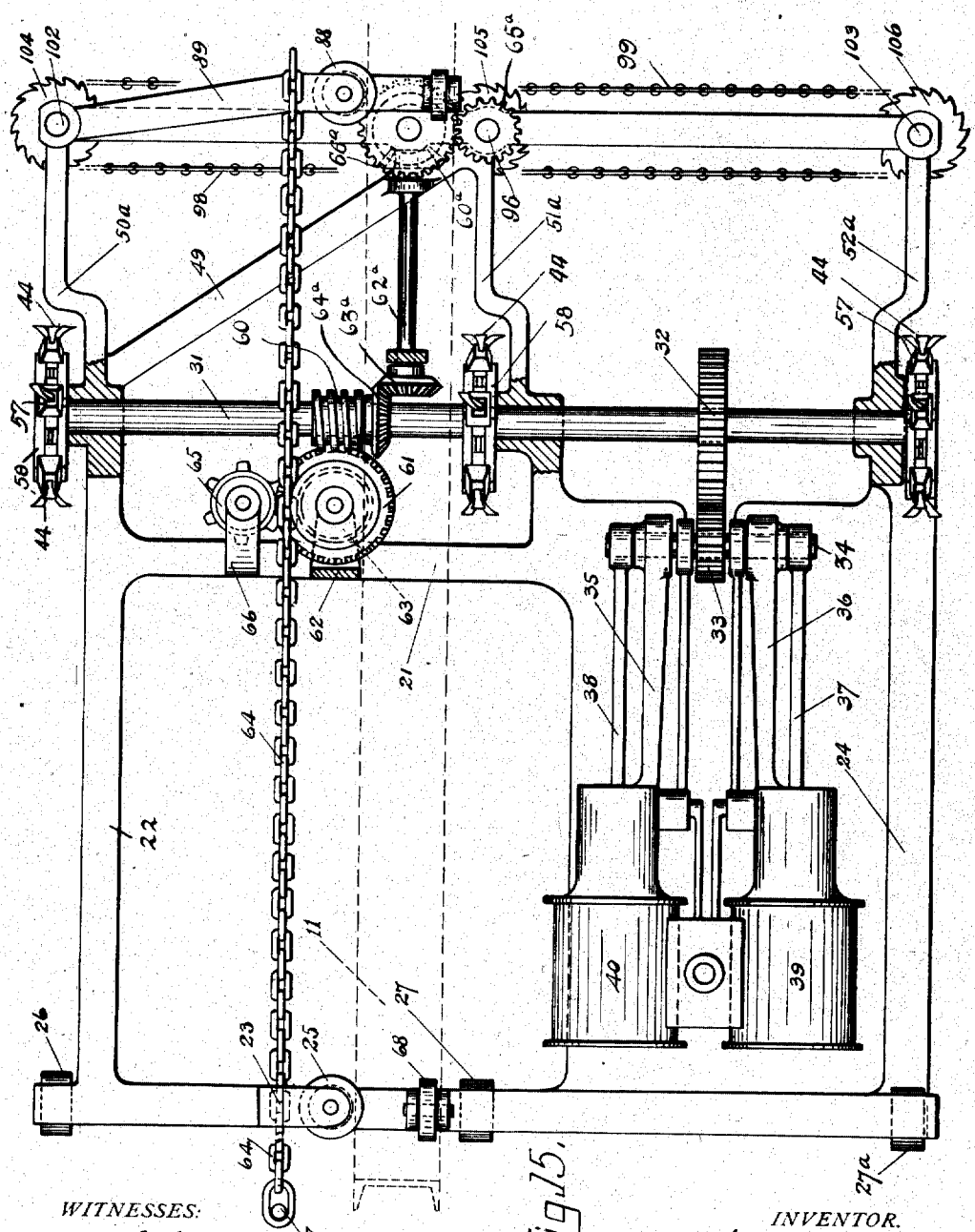

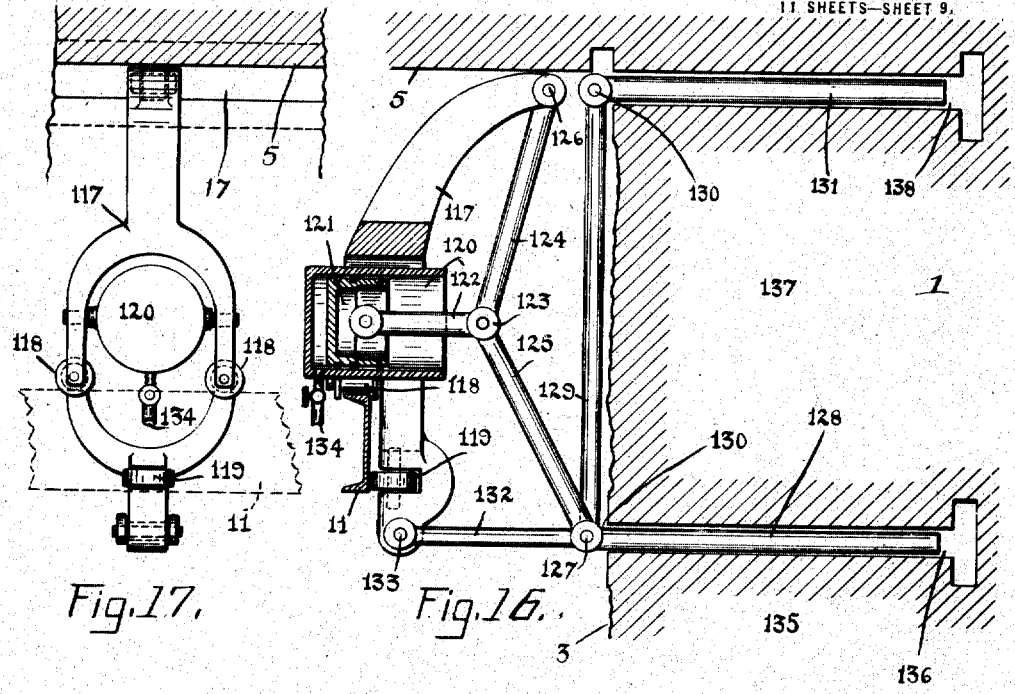

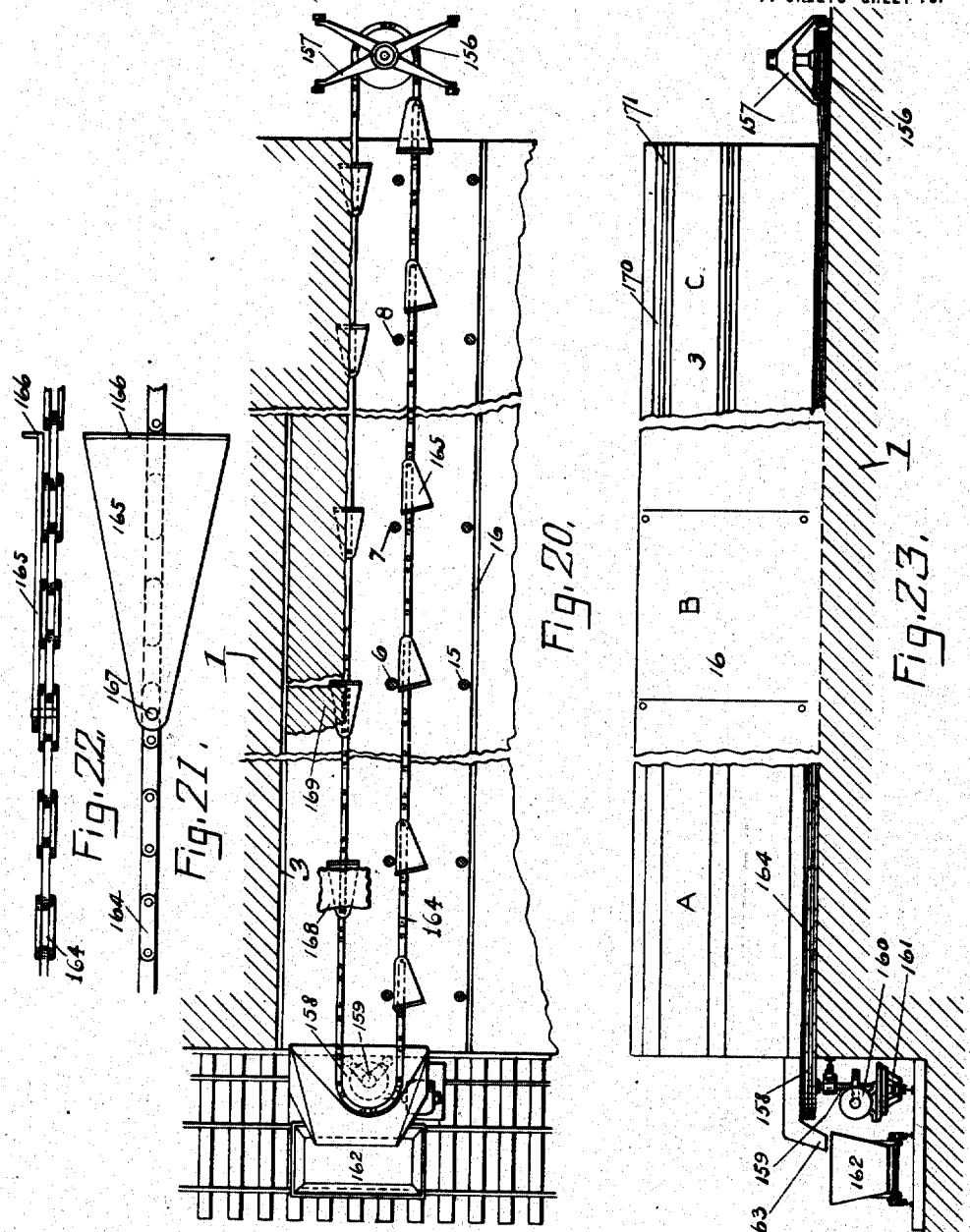

W. E. HAMILTON.
MINING APPARATUS.
APPLICATION FILED JULY 1, 1913. RENEWED SEPT. 29, 1917.

1,303,303.

Patented May 13, 1919.
11 SHEETS—SHEET 11.

WITNESSES:
H. H. Lybrand
Stanley W. Cook

INVENTOR.
William E. Hamilton
BY
H. W. Bliss
ATTORNEY.

UNITED STATES PATENT OFFICE.

WILLIAM E. HAMILTON, OF COLUMBUS, OHIO, ASSIGNOR TO THE JEFFREY MANUFACTURING COMPANY, OF COLUMBUS, OHIO, A CORPORATION OF OHIO.

MINING APPARATUS.

1,303,303.  Specification of Letters Patent.  Patented May 13, 1919.

Continuation in part of application Serial No. 515,341, filed August 30, 1909. Renewed September 29, 1916, Serial No. 122,929. This application filed July 1, 1913, Serial No. 776,864. Renewed September 29, 1917. Serial No. 194,083.

*To all whom it may concern:*

Be it known that I, WILLIAM E. HAMILTON, a citizen of the United States, residing at Columbus, in the county of Franklin and State of Ohio, have invented certain new and useful Improvements in Mining Apparatus, of which the following is a specification, reference being had therein to the accompanying drawings.

This invention relates to a system of devices for mining coal in accordance with the long wall plan. The system is adapted for the cutting of the coal in its natural bed and for carrying it away to a suitable place for loading onto cars. The apparatus comprises essentially a track rail and a series of devices adapted to be supported by the rail and to move along it to perform the several operations. Preferably, for the sake of convenience, these devices are shown as independently operable, but on this account no less closely related functionally than they would be if mechanically connected to be held in fixed relationship to each other. Not only are the devices connected to and supported by the rail, but they are so constructed that their operations have certain novel and peculiar relationships with each other. In connection with the cutting and breaking down devices there is also provided a conveyer which is independently and peculiarly related with the other parts in the manner to be described.

The principal object of the invention, therefore, is to provide a system of mining and conveying devices related to each other in a novel manner and adapted to coöperate to cut, break down, and remove the coal from its natural bed.

The apparatus herein shown is adapted to be used in carrying out a process which is set forth and claimed in my copending application Serial No. 515,341, filed August 30, 1909, and this process is not therefore claimed as a part of the present invention. The said application Serial No. 515,341 discloses an apparatus similar in many respects to that herein disclosed. This application is, therefore, a continuation of the said application Serial No. 515,341, as concerns the structural features which are common to the two applications. Said application has now matured into Patent No. 1,244,601, Oct. 30, 1917.

Figure 1 shows a plan view of kerf-cutting and slotting machines in operating position.

Fig. 2 is a plan view, showing a machine in which the kerf-cutting and slotting mechanisms are combined.

Fig. 3 is an elevation of the machines, shown in Fig. 1, together with their supporting devices.

Fig. 4 is an elevation of the machine shown in Fig. 2.

Fig. 5 is a vertical transverse section through the body of the coal, showing the kerf-cutting machine in operation, partly in section.

Fig. 6 is a plan view of the kerf cutting machine shown in Fig. 5.

Fig. 7 is a front elevation partly in section of the kerf cutting machine shown in Fig. 5. In this view there is shown a dust collecting mechanism attached to the kerf cutting devices.

Figs. 9 and 10 are detail views of parts of the dust collecting mechanism.

Fig. 14 is a plan view showing a modified construction in which the kerf cutting and the slotting mechanisms are combined in a single unitary machine.

Fig. 15 is a front elevation of the combined kerf-cutting and slotting machine, showing the source of power and its connection with the mechanisms, as well as the supporting and guiding devices.

Fig. 16 is a vertical transverse section through the body of the coal, showing the breaking mechanism, together with its guiding and supporting means.

Fig. 17 is an end view of the breaking device shown in Fig. 16.

Fig. 18 is a plan view, showing the breaking device, illustrated in Fig. 16, as mounted on the guiding and supporting rail.

Fig. 19 is an end view of the apparatus shown in Fig. 18.

Fig. 20 is a plan view showing the conveyer mechanism.

Fig. 21 is an enlarged plan view of one of the conveyer carriers.

Fig. 22 is a side elevation of a section of conveyer, chain and carrier, shown in Fig. 21.

Fig. 23 is a side elevation of the face of the long wall, showing at A a portion of the wall from which a cut of coal has been removed, at B a curtain behind which the breaking machine is at work, and at C a portion of the wall which has been cut and slotted ready for the operation of the breaking machine.

Figure 8:
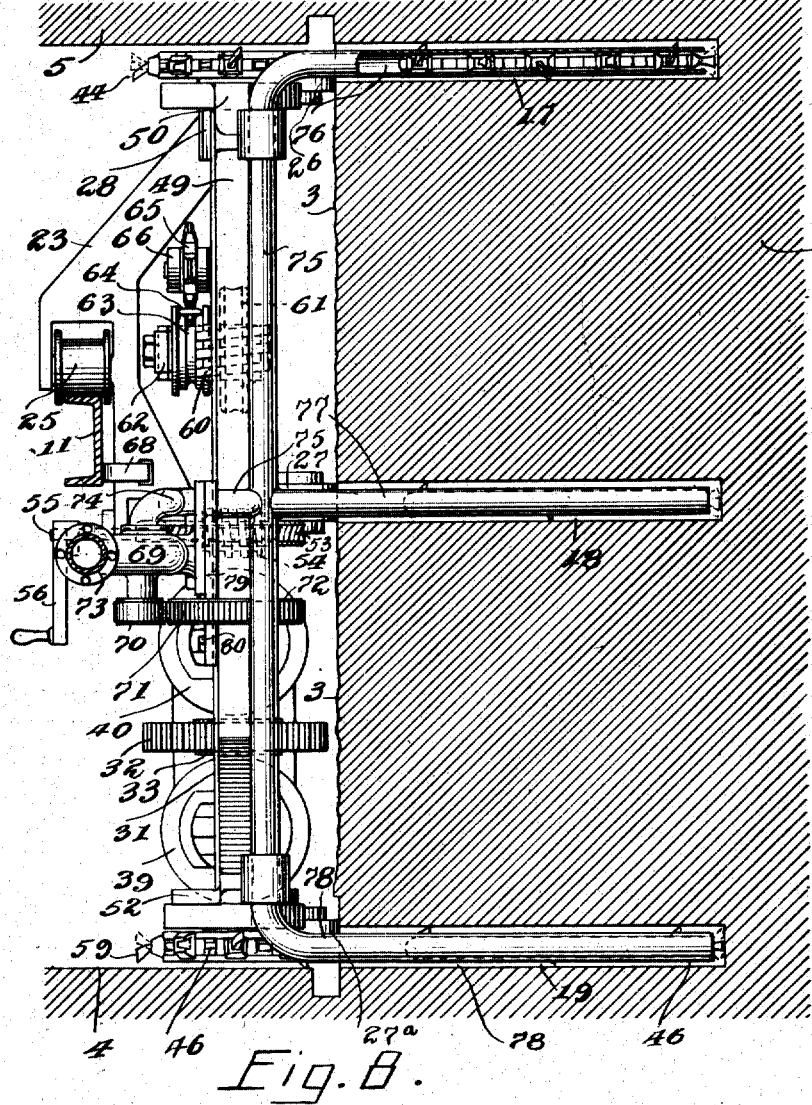
Fig. 8 is a sectional view similar to Fig. 5, but showing the dust collecting mechanism in place.
Figure 11:
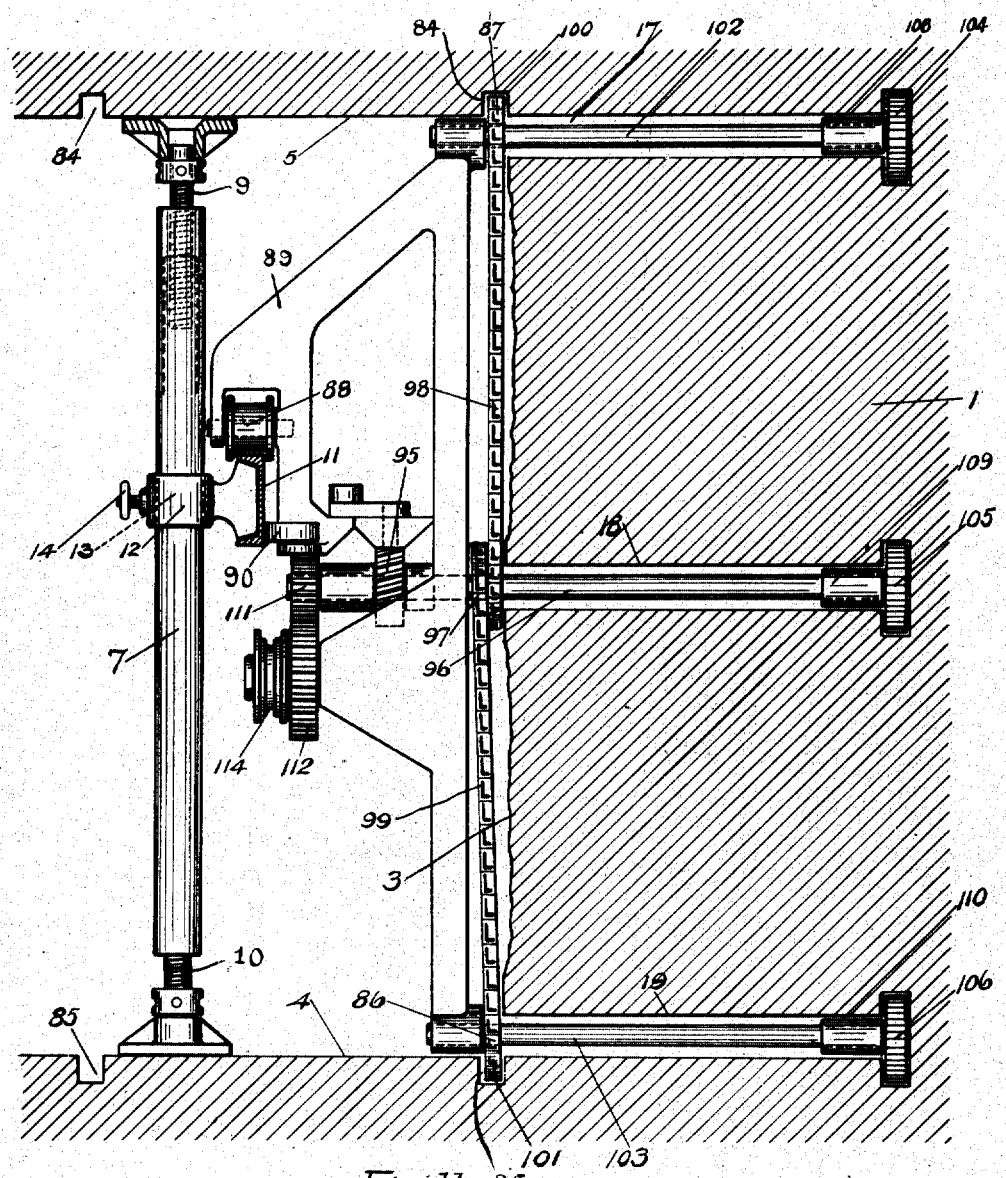
Fig. 11 is a vertical transverse section through the body of the coal, showing the vertical slotting machine in position and the means for supporting and guiding the same.

In the drawings, my mining and conveying system is shown in operation on a body of coal 2, having a working face shown at 3. The floor of the mine is shown at 4 and the roof is indicated at 5. Parallel with the working face of the wall is established a series or row of posts several of which are indicated at 6, 7 and 8. The posts are secured in position by providing at the upper and lower ends thereof threaded members 9 and 10, which are adapted to be turned into snug contact with the roof and floor respectively. The purpose of this series of posts is to support the track or guideway 11, this being accomplished, as shown in Fig. 11, by providing on each post a bracket member 12 having a vertical opening 13 therethrough to receive the body of the post and having a set-screw or hand-wheel-operated screw 14 thereon to engage the post when the bracket member 12 has been positioned as desired. The bracket member 12 is capable of being moved upward or downward on the post and in this manner the height of the track 11 can be determined at will. The track consists essentially of a channel member appropriately mounted on the bracket members 12. Because of the manner of engaging the posts with the roof and floor of the mine, the posts are easily moved from place to place and when a cut of coal has been removed as hereinafter described the series of posts will be moved inward to a new position parallel with the new face of the coal to be operated upon. Another purpose of the posts is to support a conveying system hereinafter described.

Figure 24:
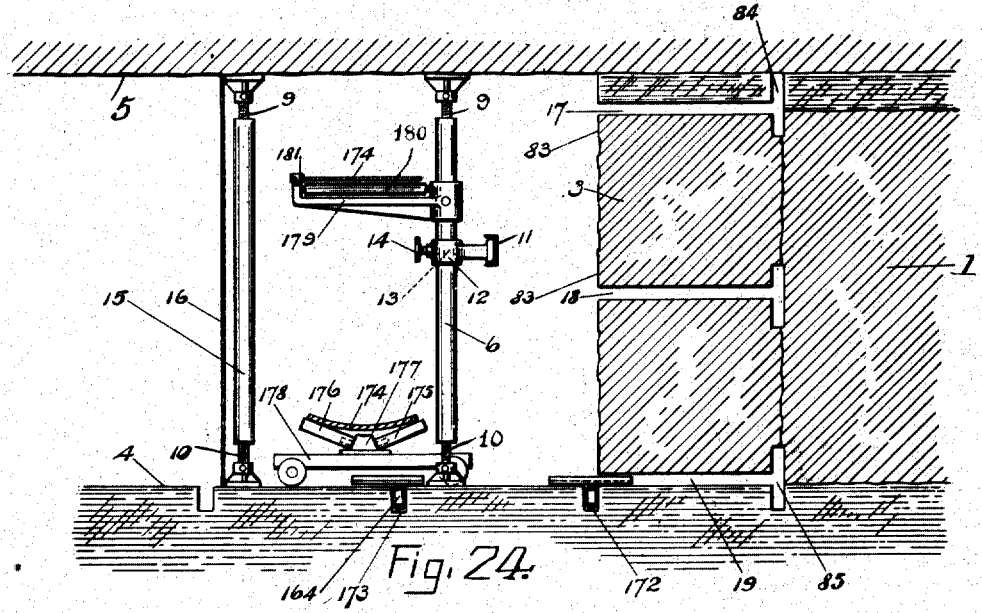
Fig. 24 is a vertical transverse section through the body of the coal, showing two conveyer systems.

I also provide a second and outer row of posts, one of which is shown in Fig. 24 at 15; these posts are similar to the posts above described and are movable in the same manner and are intended to support a curtain 16. The purpose of the curtain is to form a wall at a distance from the working face of the coal, thereby providing a passageway in the mine through which pure air can be circulated.

Each of the several machines hereinafter described is mounted on the track or guideway 11 and is movable thereon longitudinally in either direction along the face of the coal wall to be operated upon, and after the coal dislodged by the series of machines is conveyed away, the machines remain on the trackway. The track is preferably formed of appropriate sections secured together in any desired manner and the machines thereon are moved inward along with the posts to the new operating positions. This movement may be effected in any preferred manner.

The first operation is to make a number of parallel kerfs or slots in the coal, preferably in horizontal planes, and in the drawings I have illustrated a coal seam which is being mined by forming therein three such kerfs indicated at 17, 18 and 19. These channels are formed by means of the cutting machine shown in Fig. 1 generally at 20 and in greater detail in Figs. 5, 6 and 7. This cutting machine comprises the frame shown generally at 21, 22, 23 and 24 having the rollers 25 secured thereon to engage the upper flange of the channel trackway 11, whereupon it is free to travel in either direction. The rollers 68 are also provided for engaging the inner face of the channel to assist in holding the machine in place. The rollers 26, 27 and 27$^a$ engage the smooth vertical surfaces formed on the face of the coal by the slotting operation hereinafter described and thereby properly guide the cutting machine 20 along the face. The frame of the cutting mechanism has formed thereon the hubs 28, 29 and 30 in which is rotatably mounted the vertical shaft 31, carrying the gear 32. The gear 32 meshes with the pinion 33 which is driven by a suitable motor. In the construction shown the pinion is carried on the crank shaft 34 journaled in the arms 35 and 36, and actuated by the reciprocating connecting rods 37 and 38, driven by the cylinders 39 and 40. The motor is conveniently mounted on the framework, and it is not deemed essential to show in detail the manner of the mounting.

The shaft 31 carries the sprocket wheel 41 at its upper end, the sprocket wheel 42 at its middle point, and the sprocket wheel 43 at its lower end, each sprocket wheel driving one of the cutting chains shown at 44, 45 and 46. The inner end of each chain is carried by a sprocket wheel 47 mounted upon the inner end of an arm 48, the three arms being mounted upon a frame member 49, journaled on the hubs 28, 29 and 30 at 50, 51 and 52. As shown in Figs. 5 and 7, the arm 51 carried by the frame 49 has attached to its end a worm gear sector 53, with which the worm 54 meshes, the latter being carried by the shaft 55 operated through the crank 56. When the crank is turned, the frame 49 is rotated, and the arms 48 with their cutting chains are positioned for cutting or swung out from the coal as desired.

The cutter chains 44, 45 and 46 can be of any usual or preferred construction and they are formed with cutter carrying links 57 and connecting links 58. The cutting tools 59 are mounted in the links 57 and are staggered relatively to each other, as indicated in Fig. 5, so as to provide a kerf of suitable width.

The shaft 31 carries a worm 60 which meshes with the worm gear 61 mounted at 62 on the frame member 21. On the same shaft, or, if preferred, formed integral with the worm gear, is a sheave 63 with which engages the traction chain 64. A sprocket 65 is mounted at 66 on the frame 21 directly above the sheaves 63, and the traction chain 64 passes between the two wheels. As the sheave is driven through the worm 60 and the worm gear 61 the entire frame is drawn along the chain. The effect of this construction is to cause the cutting frame to be moved forward as rapidly as the cutting operation can take place. The end of the chain 64 is anchored by the stake 67, located appropriately in the mine. The opposite end of the chain 64 may be connected with the slotting machine, to provide traction therefor, and similarly may be extended to the breaking machine, if desired. In this manner the whole system of machines may move together, or they may, if preferred, be operated independently, but in sequence.

The depths of the kerfs 17, 18 and 19 formed by the cutting machine in one passage through the mine is determined by the lengths and positions of the supporting arms 48, and the width of the kerfs is determined by the degree of staggering given to the cutting tools 59. It is readily seen that more than three cutting chains may be provided on a single shaft if desired, but ordinarily a channel at the top and one at the bottom, with an intermediate channel, makes the breaking down as easy as this operation can be made. One purpose of this system of mining is to obtain the coal in large lumps which renders it more marketable, and I arrange the cutting chains appropriately to form lumps that are not too thick to be readily handled.

The dust arising in the cutting operation is objectionable for several reasons and I have provided a dust extractor which is shown in Figs. 7, 8, 9 and 10 comprising an inclosed fan 69 mounted on the shaft 70, rotated by the belt or chain 71, driven by the pulley 72 on the shaft 31. The fan casing is provided with a discharge opening 73, and into the fan casing leads a pipe 74, opening into the pipe 75, which carries thereon the dust gathering blades 76, 77 and 78. The pipe 75 and the fan casings are mounted on the frame 79, which is secured as shown at 80 to the swinging frame 49, and is therefore swung inward and outward with the cutting chains above described. The dust gathering blades or tubes inserted in the kerfs made by the cutting machine follow the cutters and are always in position to convey away the dust formed by the cutting operation. The discharge opening 73 of the fan is connected with a suitable dust receiver or collector. As such dust receivers or collectors are now well known, it is not thought necessary to herein illustrate such a one as may be used.

A second machine in the series constituting my improved mining and conveying system is the slotting machine shown in Fig. 1, generally at 81. The function of this machine is to form vertical slots at the inner edges of the kerfs formed by the cutting machine 20. One purpose of the slots is to render it easier to break down the body of coal between two of the parallel kerfs formed by the cutting machine, and also to provide a smooth bearing surface for contact with the rollers 26, 27 and 27ª, as appears especially in Figs. 5 and 24 at 83. The slots 84 formed in the roof and 85 formed in the floor also answer the purpose of accommodating the drive or sprocket wheels 86 and 87 (Fig. 11) of the slotting machine, after the coal has been broken down and the slotting machine is engaged in operating on a subsequent cutting. As shown in Fig. 11 the rollers 88 are adapted to travel on the trackway 11, the rollers being carried in the frame 89, and the rollers 90 are adapted to engage and bear against the side of the trackway 11 to guide and steady the slotting machine.

Figure 12:
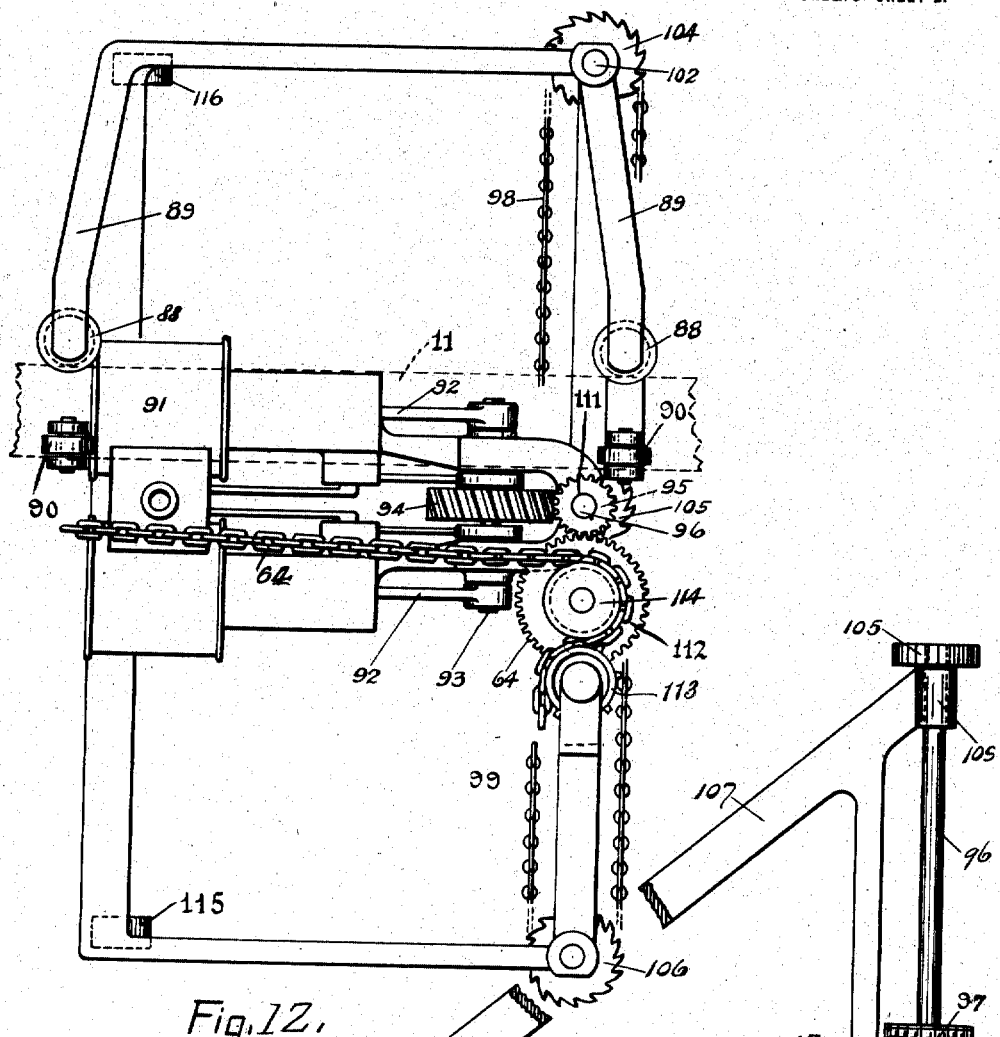
Fig. 12 is a side elevation of the slotting machine, disclosing the power connections and supporting means.
Figure 13:
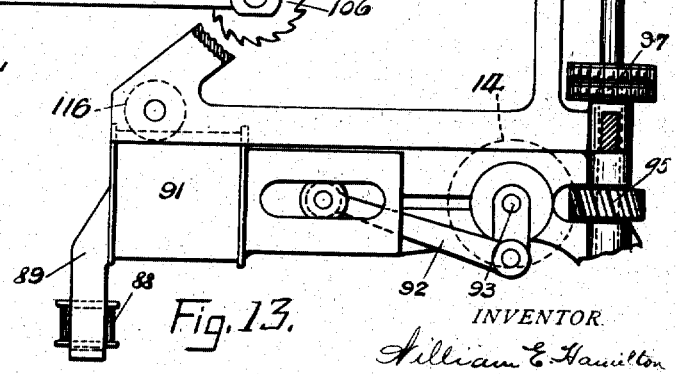
Fig. 13 is a fragmentary plan view of the slotting machine.

The slotting machine is provided with a suitable motor which is shown as comprising fluid pressure cylinders. The motor 91 (Figs. 12 and 13) has reciprocating connecting rods 92 actuating the crank shaft 93 upon which is mounted a spiral gear 94 meshing with the spiral gear 95 mounted on the cutter shaft 96, which also carries the double sprocket wheel 97. Over this wheel pass two link belts or chains 98 and 99 leading respectively to the sprocket wheels 86 and 87 mounted respectively upon the shafts 102 and 103. At the inner ends of the shafts 96, 102 and 103 are mounted the rotary cutters 104, 105, 106. The shafts with their cutters are supported by the arms, 107 (Fig. 13), which lie within the corresponding kerfs. The shafts have bearings in the inner ends of the arms as shown at 108, 109, 110.

Mounted upon the outer end of the shaft 96 is the pinion 111 adapted to mesh with the gear 112 mounted appropriately upon the frame 89. The sheave 114 driven by the gear engages the chain 64, and the machine is moved along through the connection of the chain with the stake 67. Preferably, in order to hold the chain 64 in engagement with the sheave 114 a supplemental sheave 113 may be provided. As the slotting machine moves along the face of the wall the rollers 115, 116 bear against the face and assist in the guiding of the machine.

I have described the kerf cutting mechanism and the slot cutting mechanism as being structurally independent of each other and I prefer the construction described, but, if desired, the two mechanisms can be combined to form a single unitary machine. Such a machine is shown in Figs. 2, 4, 14 and 15. The kerf cutting portion of this machine is practically the same as has been heretofore described, but the slotting machine, instead of being mounted on a separate framework, is carried upon the arms 50$^a$, 51$^a$ and 52$^a$ extending backward from the bearings 50, 51 and 52. Instead of driving the shaft 96 by means of an individual motor, this shaft carries a gear 65$^a$ meshing with the gear 66$^a$ driven by a bevel gear 60$^a$. The bevel gear 60$^a$ meshes with the bevel pinion 61$^a$ keyed to the rear end of a shaft 62$^a$. The shaft is mounted in suitable bearings in the framework and its forward end carries a bevel pinion 63$^a$ meshing with a pinion 64$^a$ keyed to the upright shaft 31.

After the slotting machine has accomplished its function in preparing the coal for breaking down, and providing guideways for the various machines in their next passage over the face of the wall, I introduce the breaking machine shown partly in Figs. 16, 17, 18 and 19. Referring to Figs. 16 and 17, a form of breaking machine is shown with its frame at 117 having rollers 118 thereon mounted on the trackway 11, and a third roller 119 thereon to engage the side of the trackway and assist in the guiding and support of the machine. In this frame 117 is carried a compressed air cylinder 120 in which the piston 121 is mounted, having pivotally connected therewith the link or piston rod 122 which at its outer end 123 connects with the toggle members 124 and 125, the former being pivotally mounted in the frame 117 at 126. Toggle member 125 is pivotally connected at its lower end 127 with a breaking lever 128 and a link 129, which is pivotally connected at 130 with the breaking lever 131. Arm 132 is pivotally associated at 127 with the members 125, 128, 129, and is mounted at its other end on the frame 117 at 133. The pipe 134 admits compressed air into the cylinder 120 to straighten the toggle 124 and 125, and the arm being fixed at its upper end, the effect of the action of the compressed air is to push downward the outer ends of the breaking levers 128 and 131. The lower block of coal 135 being undercut will tend to break away in the slot 136, while the block of coal 137 will tend to break away in the slot 138. Sufficient power being exerted, it is seen that the coal will be broken downward, and as the machine is moved along the track 11, the breaking effect is produced at successive points, the final effect being to break down all the coal that has been channeled and slotted.

Appropriate means for moving the breaking machine may be provided, it being necessary only that the machine be intermittently moved forward, remaining at one point only long enough to effect the breakage of the coal in that region.

For conveying away the coal that has been cut and dislodged by the machines above described I provide the conveying means shown in Figs. 20 to 24. As shown in Fig. 20, which is a top plan view, a large sprocket wheel 156 is mounted in the frame 157 which is appropriately anchored, and at the opposite end of the wall the sprocket wheel 158 is mounted on the shaft 159 driven by the mechanism shown at 160 on the platform 161. A car or other receptacle is shown at 162, into which the coal is discharged through the spout 163. The conveyer chain 164 formed of links as shown in Fig. 22 passes over said sprocket wheels. At intervals thereon are carrier members 165 having the upturned flange 166 thereon, one such member being shown enlarged in Fig. 21. The member is pivoted at 167, thereby being rendered free to swing out of the way of the posts shown in Fig. 20 and freely passing around the sprocket wheels at 156 and 158. The action of the conveyer chain 164 and the carrying members 165 thereon, is shown especially in Fig. 20 in which one of the carrying members is seen to be moving a detached block 168, while another is detaching the block 169.

The process of the breaking and removing is conventionally shown in Fig. 23 in which the conveyer 164 has already removed the coal which has been cut away leaving the face A. Here are clearly shown the upper, lower and middle slots made by the slotting machine and described above. In the portion of Fig. 23 marked B, there is shown in section of the curtain 16, the relative position of which is more clearly shown in Fig. 24, behind which the breaking machine is assumed to be at work. In the portion marked C at 170 is shown the upper portion of the slot made by the passage of the slotting machine on a previous trip, and at 171 is shown the kerf made by the cutting machine on its last trip. Therefore this region of the coal face is ready for the operation of the breaking machine. The portions A, B and C represent the conditions appearing in the three broken-apart regions in Fig. 20, the coal having all been removed from the end A, the removal now taking place from B and the breaking down not yet having been effected in portion C.

Figure 25:
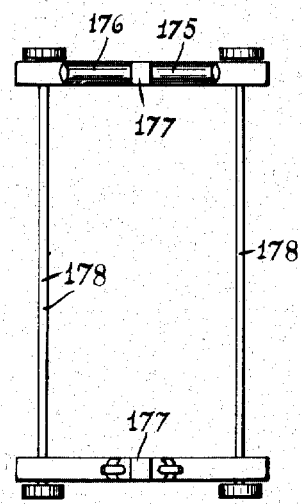
Fig. 25 is a plan view of one of the conveyer supporting trucks, shown in Fig. 24.

Referring to Fig. 24, the conveying system shown in Fig. 20 appears traveling in the slots 172 and 173, the additional function of the lower slot being herein shown. As above pointed out, the lower slot accommodates the lower sprocket wheel on the slotting machine and cutting machine, and herein it is seen that it also accommodates the conveyer construction above described. In Fig. 24 I have shown a supplemental conveyer comprising the belt 174 mounted on the roller arms 175, 176 having their bearings in frame 177 in the truck 178, which is shown in upper plan view in Fig. 25. The roller arms 175 and 176 are inclined, being higher at their outer ends, to receive between them the belt 174 which is laden with coal, the coal being placed thereon by hand. The truck 178 is constructed to be moved toward the body of the coal which is being worked. On the post 6 is mounted the bracket 179 having the roller 180 thereon over which the belt 174 moves, the latter being kept in proper position by the idler 181. The portion of the belt mounted on the truck 178 carries the coal, while the upper portion mounted on the roller 180 is the return portion. I have illustrated the belt only in vertical section, it being well understood how the belt would normally operate and how it would be mounted at its ends, and how the discharge therefrom may be effected.

Both systems of conveyers may be installed and in use at the same time, the chain and carrier system being employed for the purpose of removing the large lumps and the belt conveyer being used for carrying away broken portions of coal that may be shoveled onto it. The moving of the belt conveyer system inward toward the working face of the coal is accomplished at the same time that the suspending trackway for the cutting, slotting and breaking machines is moved, the only additional operation being the moving of the trucks 178, which is readily accomplished, and which, when located properly, may be secured in place as desired.

Either system of conveying may be used separately, if desired, and when the chain and carrier system is employed, it may be moved forward under a succeeding cut of coal by means of the supporting frames at the ends, which are seen to be mounted on wheels.

From the foregoing description it will be seen that I have provided a system of coal mining and removing devices which are closely and intimately related to each other although some of the parts are independently operable. The single track or guide serves to support and control the three machines which act upon the coal, and two of these machines are moved by engagement with the same draft chain. And the several machines are related not only structurally because of the trackway and chain and functionally because of the co-relationship of the series of operations, but also mechanically for the reason that one machine prepares the way for others which follow. The kerf cutting machine makes possible the operation of the slot cutter by providing kerfs into which the cutter supports can extend; and the kerf cutter itself is guided and controlled by the engagement of its wheels with the edges of slots formed by a previous action of the slot cutter. The slot cutter is not only guided and controlled by the engagement of its wheels with the edges of slots formed during its previous operation but its movement is also made possible by the previously formed slots in which the sprocket wheels 84 and 85 can travel. The operation of the breaking machine is made possible by the formation of the aforesaid slots which serve to partly detach the blocks of coal and form lines of breakage. The chain conveyer is guided in the slots formed by the slotting machine during previous operations. The supplemental belt conveyer when used is in part supported upon the same devices which support the guide rail for the cutting, slotting and breaking machines. And so, it will be seen that all of the parts are closely related structurally, mechanically and functionally.

What I claim is:

1. In a system of long-wall coal mining devices for performing successively a plurality of series of operations resulting in the formation of successive coal faces each parallel to the preceding one, the combination of movable roof and floor engaging posts arranged for each series of operations in a row parallel to and at a suitable distance from the coal face, a rail carried by the posts and extending along the coal face, and kerf cutting and coal breaking mechanisms movably engaging the rail and partly supported thereby and adapted respectively to cut a series of vertically separated horizontal kerfs in the coal and to break down the blocks of coal between the kerfs, the said rail being disposed at an elevation between the levels of the uppermost and lowermost kerfs, whereby the kerf cutting and breaking mechanisms are supported substantially centrally when in operation.

2. In a system of long-wall coal mining devices for performing successively a plurality of series of operations resulting in the formation of successive coal faces each parallel to the preceding one, the combination of movable roof and floor engaging posts arranged for each series of operations in a row parallel to and at a suitable distance from the coal face, a rail carried by the posts at an elevation between the levels of the uppermost and the lowermost kerfs and extending along the coal face, and kerf cutting, slot cutting and coal breaking mechanisms movably engaging the rail and partly supported thereby and adapted respectively to simultaneously cut a series of vertically separated horizontal kerfs in the coal, to simultaneously cut slots extending upward and downward from the inner edge of each of the kerfs and to break down the blocks of coal between the kerfs and partly severed by the slot cutting mechanism, whereby the said coal-cutting and breaking-down mechanisms are supported when in operation substantially centrally.

3. In a system of long-wall coal mining devices for performing successively a plurality of series of operations resulting in the formation of successive coal faces each parallel to the preceding one, the combination of a movable rail positioned for each series of operations parallel to and at a suitable distance from the coal face, rail engaging kerf and slot cutting mechanisms movable along the rail and adapted respectively to cut a series of vertically separated horizontal kerfs in the coal, one near the floor, and slots extending upward and downward from the inner edge of each of the kerfs, a rail engaging coal breaking mechanism movable along the rail independently of the kerf and slot cutting mechanisms and having devices for entering the kerfs formed by the kerf cutting mechanism and breaking down the blocks of coal partly severed by the slot cutting mechanism, and a conveyer movable along the coal face to remove the coal broken down by the breaking mechanism and having guide devices adapted to enter the slot in the floor formed by the slot cutting mechanism during the preceding series of operations.

4. In a system of long-wall coal mining devices for performing successively a plurality of series of operations resulting in the formation of successive coal faces each parallel to the preceding one, the combination of a movable rail positioned for each series of operations parallel to and at a suitable distance from the coal face, rail engaging kerf and slot cutting mechanisms movable along the rail and adapted respectively to cut a series of vertically separated horizontal kerfs in the coal, one near the floor, and slots extending upward and downward from the inner edge of each of the kerfs, a rail engaging coal breaking mechanism movable along the rail independently of the kerf and slot cutting mechanisms and having devices for entering the kerfs formed by the kerf cutting mechanism and breaking down the blocks of coal partly severed by the slot cutting mechanism, and an endless conveyer having parallel strands movable along the coal face, one of them serving to remove the coal broken down by the breaking mechanism, the said conveyer having guide devices of which those on the active strand are adapted to enter the slot in the floor formed by the slot cutting mechanism during the next preceding series of operations and of which those on the inactive strand are adapted to enter the slot in the floor formed by the slot cutting mechanism during the second preceding series of operations.

5. In a system of long-wall coal mining devices for performing successively a plurality of series of operations resulting in the successive formation of coal faces each parallel to the preceding one, the combination of a movable rail positioned for each series of operations at a suitable distance from the coal face and parallel thereto, rail engaging kerf and slot cutting mechanisms movable along the rail and adapted respectively to cut a series of vertically separated horizontal kerfs in the coal and slots extending upward and downward from the inner edge of each of the kerfs, and guide devices on the said mechanisms for engaging the inner surfaces of the slots cut during the preceding series of operations.

6. In a system of long-wall coal mining devices for performing successively a plurality of series of operations resulting in the successive formation of coal faces each parallel to the preceding one, the combination of a movable rail positioned for each series of operations at a suitable distance from the coal face and parallel thereto, a rail engaging kerf cutting mechanism movable along the rail and adapted to cut a series of vertically separated horizontal kerfs in the coal, a rail engaging slot cutting mechanism movable along the rail independently of the kerf cutting machine and adapted to cut slots extending upward and downward from the inner edge of each of the kerfs, and guide devices on the said kerf and slot cutting mechanisms for engaging the inner surfaces of the slots cut during the preceding series of operations.

7. In a system of long-wall coal mining devices for performing successively a plurality of series of operations resulting in the successive formation of coal faces each parallel to the preceding one, the combination of a movable rail positioned for each series of operations at a suitable distance from the coal face and parallel thereto, a rail engaging kerf cutting mechanism movable along the rail and adapted to cut a series of vertically separated horizontal kerfs in the coal, and a rail engaging slot cutting mechanism movable along the rail and comprising horizontal shafts positioned to extend into the kerfs cut by the kerf cutting mechanism, cutters at the ends of the shafts to cut slots extending upward and downward from the inner edge of each of the kerfs and power receiving drive wheels on the upper and lower shafts positioned to extend respectively upward and downward into the slots cut during the preceding series of operations in the roof and in the floor.

8. In a system of long-wall coal mining devices for performing successively a plurality of series of operations resulting in the formation of successive coal faces each parallel to the preceding one, the combination of a movable rail positioned for each series of operations at a suitable distance from the coal face and parallel thereto, a rail engaging kerf cutting mechanism movable along the rail and adapted to cut a series of vertically separated horizontal kerfs in the coal, a rail engaging slot cutting mechanism movable along the rail and comprising horizontal shafts positioned to extend into the kerfs cut by the kerf cutting mechanism, cutters at the ends of the shafts to cut slots extending upward and downward from the inner edge of each of the kerfs and power receiving drive wheels on the upper and lower shafts positioned to extend respectively upward and downward into the slots cut during the preceding series of operations in the roof and in the floor, and guide devices on the said kerf and slot cutting mechanisms for engaging the inner surfaces of the slots cut during the preceding series of operations.

9. In a system of long-wall coal mining devices for performing successively a plurality of series of operations resulting in the formation of successive coal faces each parallel to the preceding one, the combination of a movable rail positioned for each series of operations at a suitable distance from the coal face and parallel thereto, a rail engaging kerf cutting mechanism movable along the rail and adapted to cut a series of vertically separated horizontal kerfs in the coal, a rail engaging slot cutting mechanism movable along the rail and comprising horizontal shafts positioned to extend into the kerfs cut by the kerf cutting mechanism, cutters at the ends of the shafts to cut slots extending upward and downward from the inner edge of each of the kerfs and power receiving drive wheels on the upper and lower shafts positioned to extend respectively upward and downward into the slots cut during the preceding series of operations in the roof and in the floor, a rail engaging coal breaking mechanism movable along the rail independently of the kerf and slot cutting mechanisms and having devices for entering the kerfs formed by the kerf cutting mechanism and breaking down the blocks of coal partly severed by the slot cutting mechanism, and a conveyer movable along the coal face to remove the coal broken down by the breaking mechanism and having guide devices adapted to enter the slot in the floor formed by the slot cutting mechanism during the preceding series of operations.

10. In a system of long-wall coal mining devices for performing successively a plurality of series of operations resulting in the formation of successive coal faces each parallel to the preceding one, the combination of a movable rail positioned for each series of operations at a suitable distance from the coal face and parallel thereto, a rail engaging independently driven kerf cutting mechanism movable along the rail and adapted to cut a series of vertically separated horizontal kerfs in the coal, a rail engaging independently driven slot cutting mechanisms movable along the rail independently of the kerf cutting mechanism and adapted to cut slots extending upward and downward from the inner edge of each of the kerfs, a chain anchored at a point in advance of the kerf cutting mechanism, and means on the kerf and slot cutting mechanisms for both engaging the said chain to feed the mechanisms forward.

In testimony whereof I affix my signature in the presence of two witnesses.

WILLIAM E. HAMILTON.

Witnesses:
J. S. WILLIAMS,
DUDLEY T. FISHER.

Copies of this patent may be obtained for five cents each, by addressing the "Commissioner of Patents, Washington, D. C."